Figure 1:
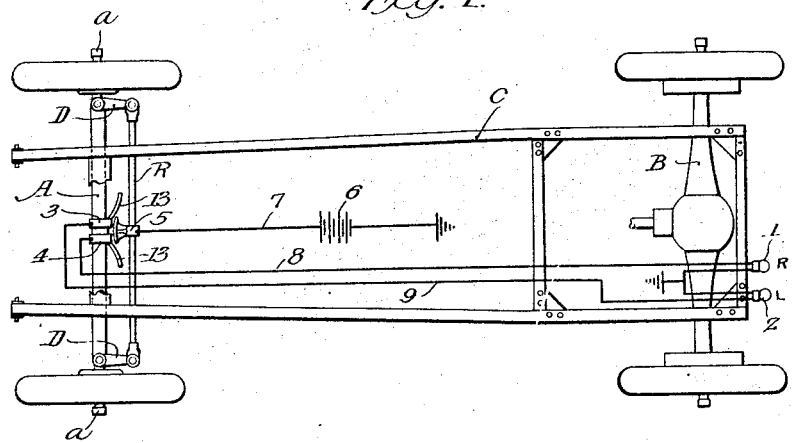

Nov. 9, 1926.  1,606,725
R. SABATH
DIRECTION INDICATOR FOR AUTOMOBILES
Filed June 20, 1923

Inventor
Rudolph Sabath
By
Attorney

Patented Nov. 9, 1926.

1,606,725

UNITED STATES PATENT OFFICE.

RUDOLPH SABATH, OF CHICAGO, ILLINOIS.

DIRECTION INDICATOR FOR AUTOMOBILES.

Application filed June 20, 1923. Serial No. 646,679.

The present invention relates to direction indicators for automobiles, and particularly means for electrically causing the operation of the indicator automatically by the position of the steering gear of the vehicle.

This invention is more particularly concerned with the type of contact make and break used in closing the electrical circuits to the indicator, and has for its object the provision of contact means having a simple construction permitting it to be manufactured at a very low cost, and which can be applied to the automobile without disassembling the car or requiring the services of skilled mechanics, while at the same time being very durable and efficient in operation.

In this specification and the annexed drawings, the invention is disclosed in the form in which it is considered to be the best, but the invention is not limited to such form because it is capable of being embodied in other forms; and it is to be understood that in and by the claims following the description herein it is intended to cover the invention in whatever form it may embody within the scope thereof.

Figure 2:
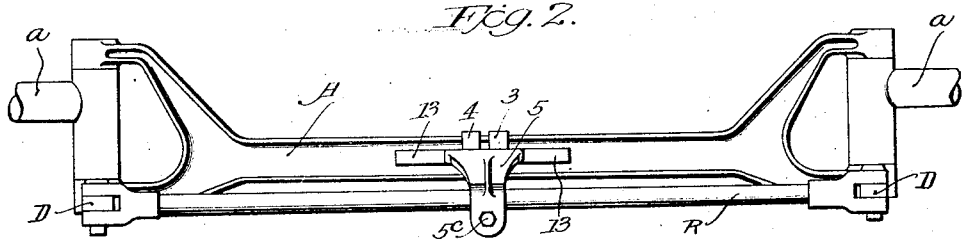
Figure 5:
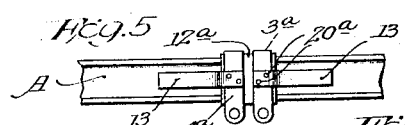
Figures 3, 4:
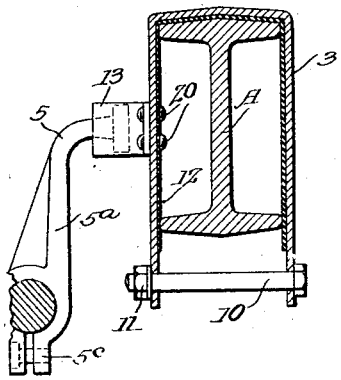

Referring to the drawings which illustrate the preferred embodiments of the invention as at present devised:

Figure 1 is a plan view of the automobile chassis equipped with the invention,

Fig. 2 is a transverse sectional view taken substantially on line 2—2 of Fig. 1, and looking in the direction of the arrows, Fig. 3 is an enlarged detailed cross sectional view of the front axle of the chassis, showing one of the contact devices applied thereto, Fig. 4 is a fragmentary detailed view of the automobile chassis having a different type of steering mechanism than shown in Fig. 1, and equipped with the invention, and Fig. 5 is an elevation of a modified form of contacts 3 and 4.

Like characters denote similar and like parts through the specification and drawings.

Referring particularly to the drawings, C denotes the chassis frame of the automobile supported at its rear end by the axle B, and at its front end by the axle A. The wheels on the ends of the front axle A are pivotally supported in the usual manner on the stub axles $a$, having connected thereto the arms D which are pivotally connected by the usual reach rod R. The stub axles $a$ are connected as usual, in a suitable manner to the steering post, not shown, carried on the chassis, and upon operation of the steering post the wheels are moved in unison by virtue of the reach rod R to the left or right to effect the proper steering of the vehicle.

In practically all makes of cars having a chassis of the type shown in Fig. 1, the reach rod R lies directly behind the front axle A, and spaced therefrom, as indicated in Figs. 1 and 2.

The signal device of the present invention may consist of any suitable character of indicator placed on the front, rear or sides of the car, and comprising lights, semaphores, changeable signs or the like. However, in the present drawings this means is diagrammatically illustrated as comprising two electric lights, 1 and 2, which when illuminated will indicate the vehicle will turn to right or left respectively. This indicating means is shown as positioned on the rear of the vehicle. To this end contacts 3 and 4 are attached to the front axle, each in circuit with one of the lights 1 and 2, the circuit being closed according to the movement of the steering gear by contact 5 on the reach rod, this contact 5 being illustrated as having electric connection with the battery 6, through the conductor 7, and the contacts 3 and 4 having electric connection with the lights 2 and 3 respectively, through the conductors 8 and 9 respectively; the circuits being grounded through the frames as indicated.

The construction of the contact members 3 and 4 are identical, and the description of one will suffice for the other. These contact devices 3 and 4 each comprise a U-shaped clip of sufficient size to fit over the front axle A of the vehicle, as indicated in Fig. 3.

The clip is maintained on the axle by suitable clamping means to draw or bind the legs of the clip in tight engagement with the axle. In the present instance this means is shown as consisting of a bolt 10 extending through suitable apertures in the free ends of the legs of the clip, a nut 11 maintaining the bolt in clamped position.

The inner surfaces of the clips are covered with a suitable lining 12 of insulating material, such as fibre, rubber or the like, which may be attached thereto by cement, riveting or in any approved manner to insulate it from the axle.

To one leg of each clip 3 is secured one end of the resilient contact finger 13. The other end of the finger extends laterally from the clip and transversely thereof, so as to lie, when the clip is applied to the axle, in the same general direction as the axle.

In practice the clips 3 and 4 are secured to the axle in the manner shown in the drawings at slight distances apart. The spring fingers 13 of each contact member 3 and 4 extend in opposite directions as shown particularly in Figs. 1 and 2. The fingers are slightly curved or offset through their length to lie in the path to the contact 5 as it is shifted to the right or left by the movement of the reach rod R.

The contact member 5 takes the form of a wiping shoe or brush having a shank 5ª extending therefrom, and slit and grooved at one end to fit around the reach bar R there being a clamping bolt 5ᶜ to tightly secure it to the rod. The contact surface of the shoe 5 is smooth and preferably convexed, as illustrated.

In assembling the contact device of this invention the shoe 5 is secured to the reach rod to lie between the fingers 13 of each of the clips 3 and 4 and out of contact therewith, when the steering gear is in a position to direct the vehicle in a straight way, forwardly or backwardly.

When the steering gear is actuated to move the wheels to the right, the reach rod is correspondingly shifted and contacts with the finger 13 of the contact member 4, thereby closing the circuit from the battery 6, through the conductor 7 and conductor 8, to the light or indicator 1, and thence grounded. When the wheels are shifted to turn to the left, the reach bar is correspondingly shifted to contact with the resilient finger 13 of the contact member 3, closing the circuit from the battery 6, through the conductors 7 and 9 to the light or indicator 2, and thence grounded.

It will be observed that the contact devices 3, 4 and 5 are of such construction as can be manufactured at a very low cost, and can be applied to the machine without the need of mechanical skill, and are adjustable along the length of the axle A and reach rod R to such points as are convenient and desirable. It will also be observed that the contact devices of this invention are such as will not be exposed to view and render the car unsightly.

In Fig. 5 is shown the devices 3 and 4 secured together in a unitary structure, by providing an insulating lining 12ª of greater width, and securing the clippings 3ª and 4ª to the opposite ends thereof by the rivets 20ª.

In Fig. 4 the invention is shown as applied to the chassis having a different type of steering gear than shown in Fig. 1. In this form of the invention, the steering post, not shown, is connected to the rotatable arm E, which is connected to the drag rod F, extending substantially longitudinal of the frame and connected to the stub axle S by a suitable arm G. The spring contact members 3ᵇ and 4ᵇ, corresponding to the contact members 3 and 4 in Fig. 1, are secured to the frame H and the wipe shoe 5ᵇ is connected to the drag rod F.

Having thus described the invention what is claimed as new and desired to be secured by Letters Patent, is:

1. A switch for use with vehicles comprising a pair of substantially U-shaped clips, an electric insulating lining secured to the inner faces of said clips and joining said clips together in said spaced relation, said clips being adapted to fit over the front axle of the vehicle, means for binding said clips to the axle, flat resilient spring fingers, one secured at one end to each clip and having its other end off-set and extending laterally therefrom, a contact arm to be mounted on the connecting rod of the steering gear of the vehicle and to have a wiping contact with said fingers as the rod is moved endwise, said fingers being shaped to diverge rearwardly and lie in the path of movement of said contact arm on the connecting rod to provide a continued contact during the entire movement of the steering gear from forward position.

2. A switch comprising a pair of clips adapted to fit over a stationary portion of the vehicle frame and insulated therefrom, means for securing said clips in position, a spring finger secured at one end to each of said clips and extending laterally therefrom, a contact member to be secured to a movable element of the steering gear of a vehicle and to normally lie between said contact fingers and out of engagement therewith, said spring fingers on the said clips being arranged to diverge relatively to each other when the clips are secured in position and to lie in the path of movement of said contact member, whereby a continued electrical contact is provided as the steering gear is moved from side-to-side.

In testimony whereof I have hereunto set my hand.

RUDOLPH SABATH.